United States Patent
Lund et al.

(10) Patent No.: US 10,132,295 B2
(45) Date of Patent: Nov. 20, 2018

(54) DIGITAL SYSTEM AND METHOD FOR MANAGING A WIND FARM HAVING PLURALITY OF WIND TURBINES COUPLED TO POWER GRID

(71) Applicant: General Electric Company, Schenectady, NY (US)

(72) Inventors: Arnold M. Lund, Oakland, CA (US); Karl Mochel, San Francisco, CA (US); Jeng-Weei Lin, Danville, CA (US); Raimundo Onetto, Walnut Creek, CA (US); Jayanthi Srinivasan, San Ramon, CA (US); Peter Gregg, Niskayuna, NY (US); Jeffrey Eric Bergman, Mechanicville, NY (US); Kenneth D. Hartling, Milpitas, CA (US); Anwar Ahmed, San Ramon, CA (US); Sham Chotai, Woodside, CA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 192 days.

(21) Appl. No.: 15/075,231

(22) Filed: Mar. 21, 2016

(65) Prior Publication Data
US 2016/0333855 A1 Nov. 17, 2016

Related U.S. Application Data

(63) Continuation-in-part of application No. 14/646,677, filed on May 21, 2015, now Pat. No. 9,569,073.
(Continued)

(51) Int. Cl.
*F03D 7/04* (2006.01)
*G05B 13/04* (2006.01)
(Continued)

(52) U.S. Cl.
CPC .............. *F03D 7/048* (2013.01); *F03D 7/043* (2013.01); *F03D 7/045* (2013.01); *F03D 7/047* (2013.01);
(Continued)

(58) Field of Classification Search
CPC .......... F03D 7/047; F03D 7/048; H02J 3/386; G06F 17/40; G06Q 50/06; G05B 13/021; Y02E 40/76; Y04S 10/545
See application file for complete search history.

(56) References Cited

U.S. PATENT DOCUMENTS 7,013,203 B2  3/2006 Moore et al.
7,318,154 B2 *  1/2008 Tehee, Jr. ................ F03D 7/028
                                                    713/155

(Continued)

FOREIGN PATENT DOCUMENTS

EP          2607690 A1     6/2013

OTHER PUBLICATIONS

Arantxa et al., "Digital Simulation Performance of a Wind Farm", 10th Mediterranean Electrotechnical Conference, vol. No. III, pp. 1153-1156, 2000.
(Continued)

*Primary Examiner* — Ramesh B Patel
(74) *Attorney, Agent, or Firm* — GE Global Patent Operation; Nitin Joshi

(57) ABSTRACT

The present disclosure is directed to a digital system for managing a wind farm having a plurality of wind turbines electrically coupled to a power grid. The system includes a farm-based first communication network having one or more individual wind turbine control systems communicatively coupled to the one or more wind turbines and an overall wind farm control system. The system also includes a cloud-based second communication network communica-
(Continued)

tively coupled to the first communication network via an industrial gateway. The second communication network includes a digital infrastructure having a plurality of digital models of the one or more wind turbines, wherein the plurality of digital models of the one or more wind turbines are continuously updated during operation of the wind farm via data supplied by the farm-based first communication network.

20 Claims, 11 Drawing Sheets

Related U.S. Application Data

(60) Provisional application No. 62/162,547, filed on May 15, 2015.

(51) Int. Cl.
*F03D 9/00* (2016.01)
*F03D 17/00* (2016.01)
*F03D 9/25* (2016.01)

(52) U.S. Cl.
CPC ............ *F03D 9/257* (2017.02); *F03D 17/00* (2016.05); *G05B 13/041* (2013.01); *F05B 2260/82* (2013.01); *Y02E 10/723* (2013.01); *Y02P 80/22* (2015.11)

(56) References Cited

U.S. PATENT DOCUMENTS

| | | | |
|---|---|---|---|
| 8,295,989 B2 | 10/2012 | Rettger et al. | |
| 8,401,709 B2 | 3/2013 | Cherian et al. | |
| 8,433,425 B2* | 4/2013 | Vasudevarao | F03D 7/048 290/44 |
| 8,503,443 B2 | 8/2013 | Lovmand | |
| 8,761,948 B1 | 6/2014 | Ippolito et al. | |
| 8,966,117 B1 | 2/2015 | Osburn, III | |
| 2002/0029097 A1* | 3/2002 | Pionzio, Jr. | F03D 7/047 700/286 |
| 2007/0266423 A1* | 11/2007 | Tehee, Jr. | F03D 7/028 726/3 |
| 2008/0046387 A1* | 2/2008 | Gopal | G01D 4/004 705/412 |
| 2008/0234871 A1* | 9/2008 | Yamada | G06Q 50/06 700/286 |
| 2009/0281675 A1* | 11/2009 | Rasmussen | F03D 7/047 700/287 |
| 2009/0281677 A1* | 11/2009 | Botich | G06Q 10/00 700/295 |
| 2011/0054825 A1* | 3/2011 | Perla | G05B 23/0286 702/113 |
| 2011/0193423 A1* | 8/2011 | Stalker | H02J 3/14 307/154 |
| 2012/0066604 A1* | 3/2012 | Vasudevarao | F03D 7/048 715/735 |
| 2014/0176337 A1* | 6/2014 | Valin | H04Q 9/00 340/870.02 |
| 2014/0277795 A1* | 9/2014 | Matsuoka | G06Q 30/0202 700/291 |
| 2015/0115610 A1 | 4/2015 | Quinlan et al. | |
| 2015/0219074 A1 | 8/2015 | Babazadeh et al. | |
| 2016/0080902 A1* | 3/2016 | Du Plessis | F03D 17/00 455/456.1 |
| 2016/0333854 A1 | 11/2016 | Lund et al. | |
| 2017/0328344 A1* | 11/2017 | Erbacher | F03D 7/048 |

OTHER PUBLICATIONS

Sun et al., "Condition Assessment of Wind Turbine Generators based on Cloud Model", 2013 IEEE International Conference on Solid Dielectrics, pp. 146-151, Jun. 30-Jul. 4, 2013.

* cited by examiner

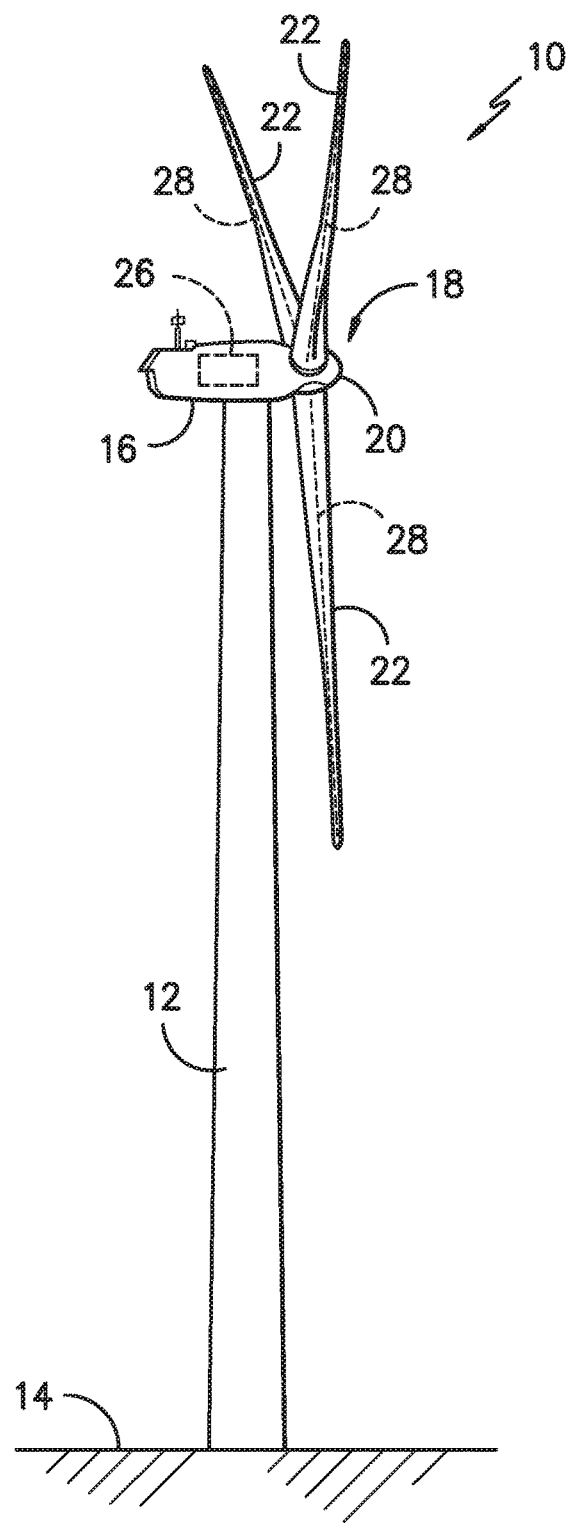
FIG. -1-

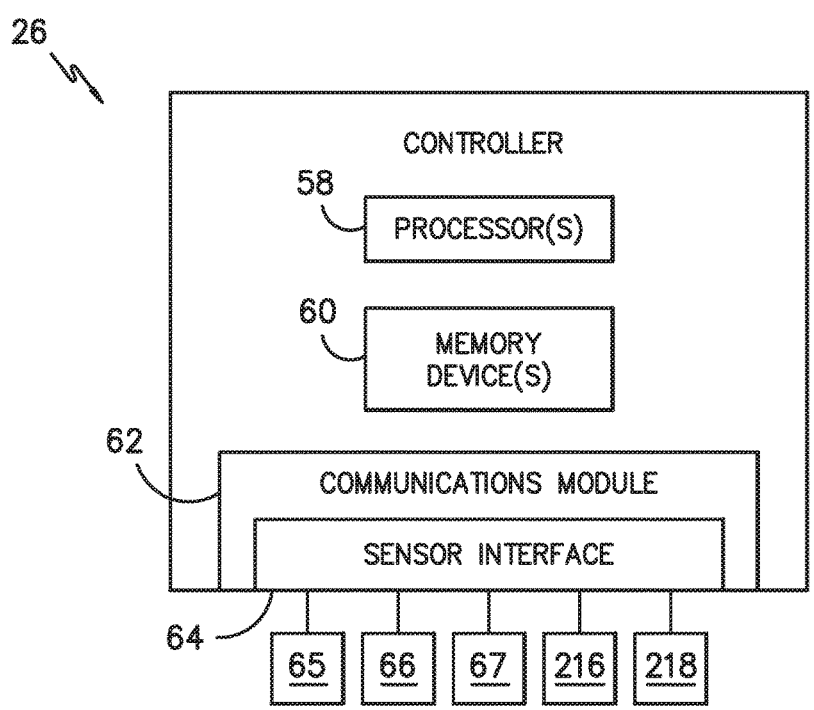
FIG. -2-

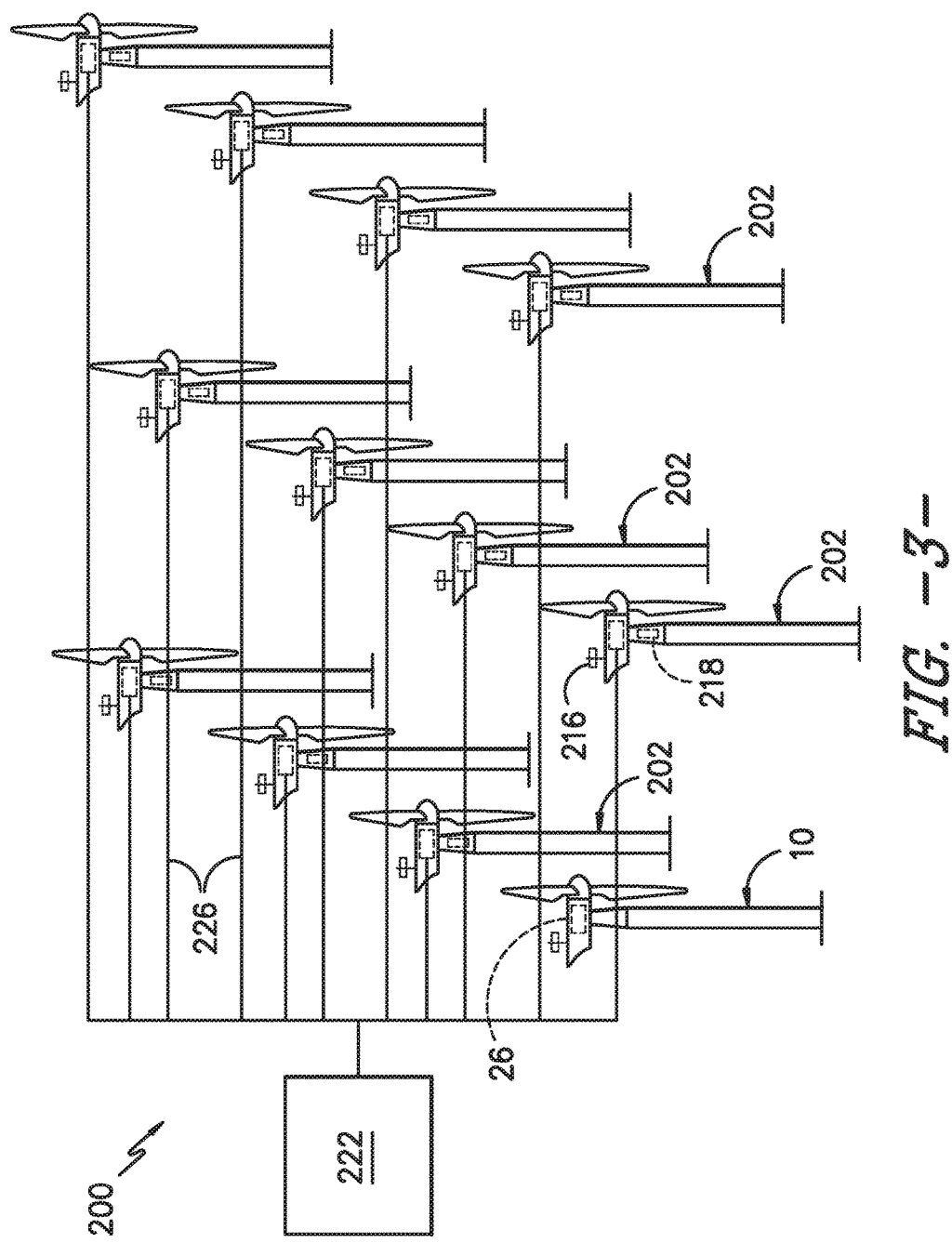

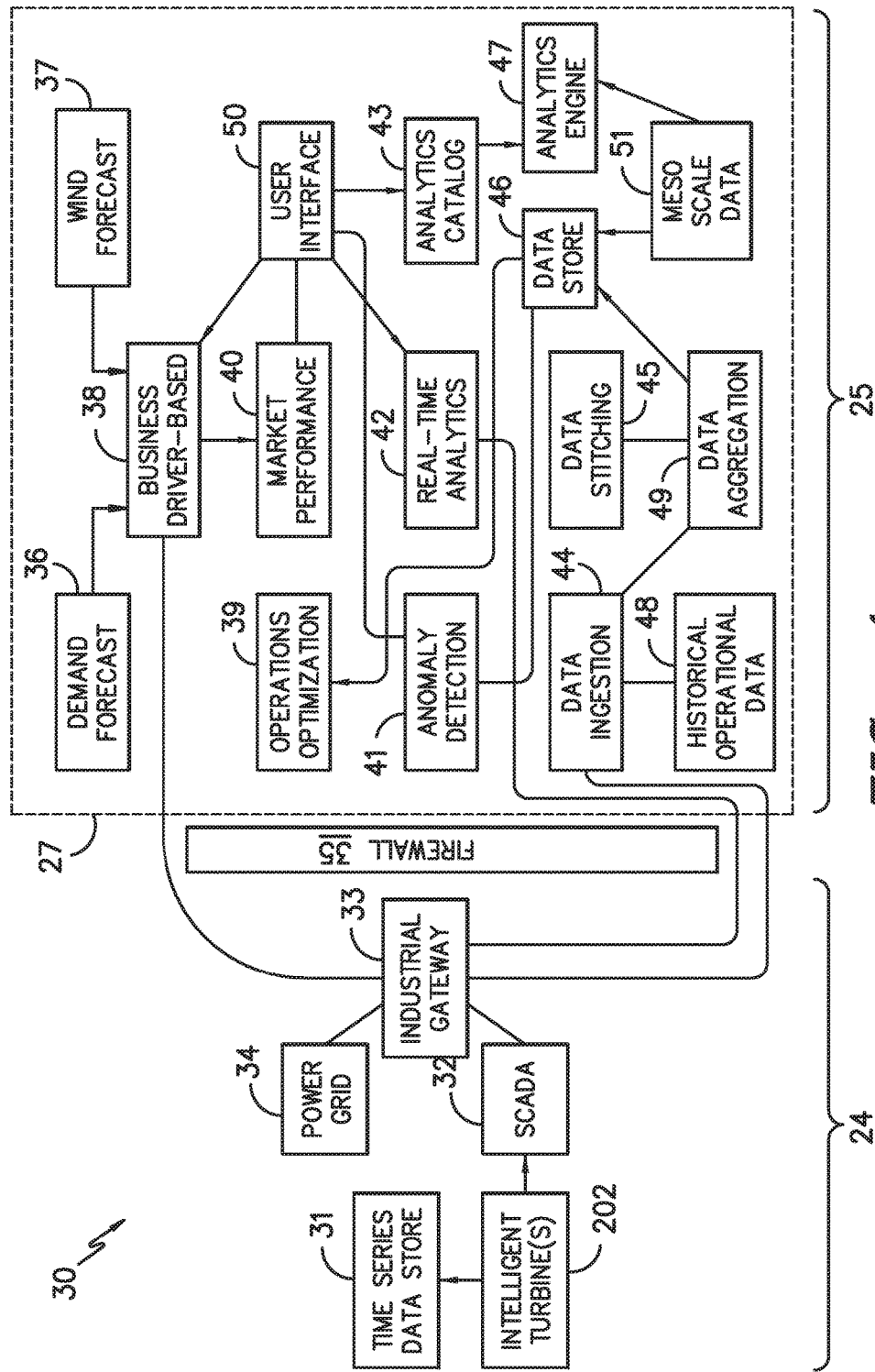
FIG. -4-

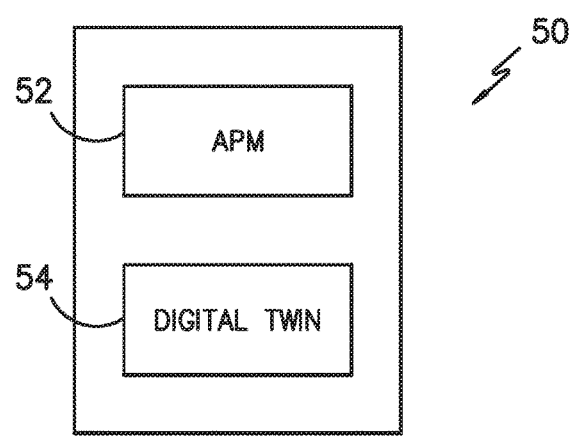
FIG. -5-
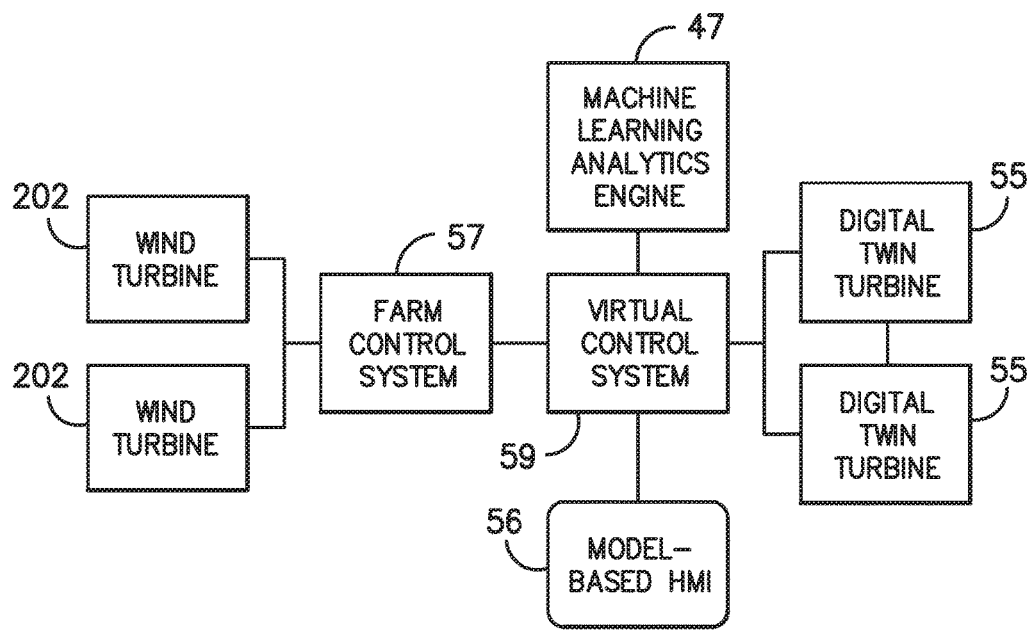
FIG. -6-

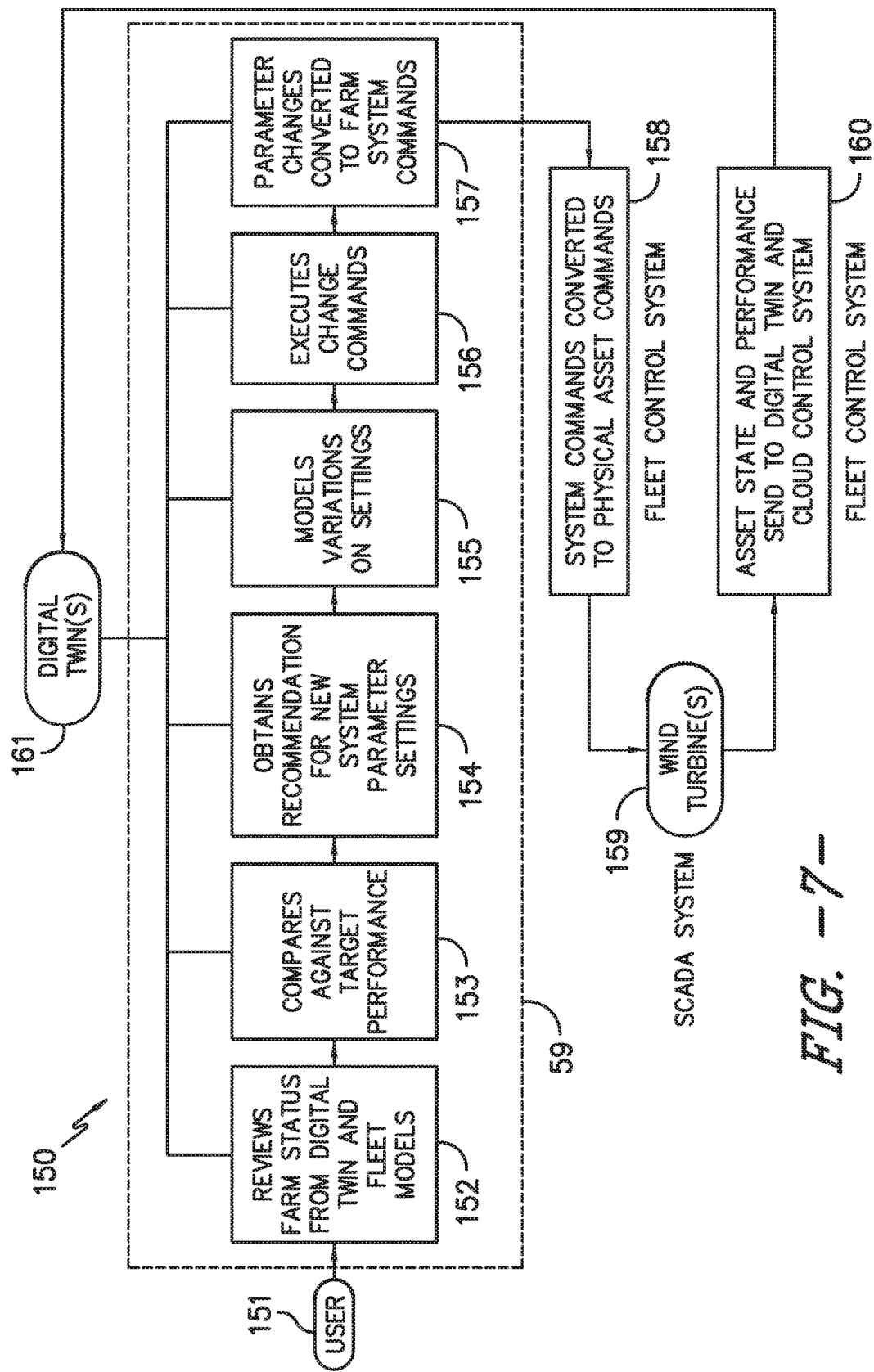
FIG. -7-

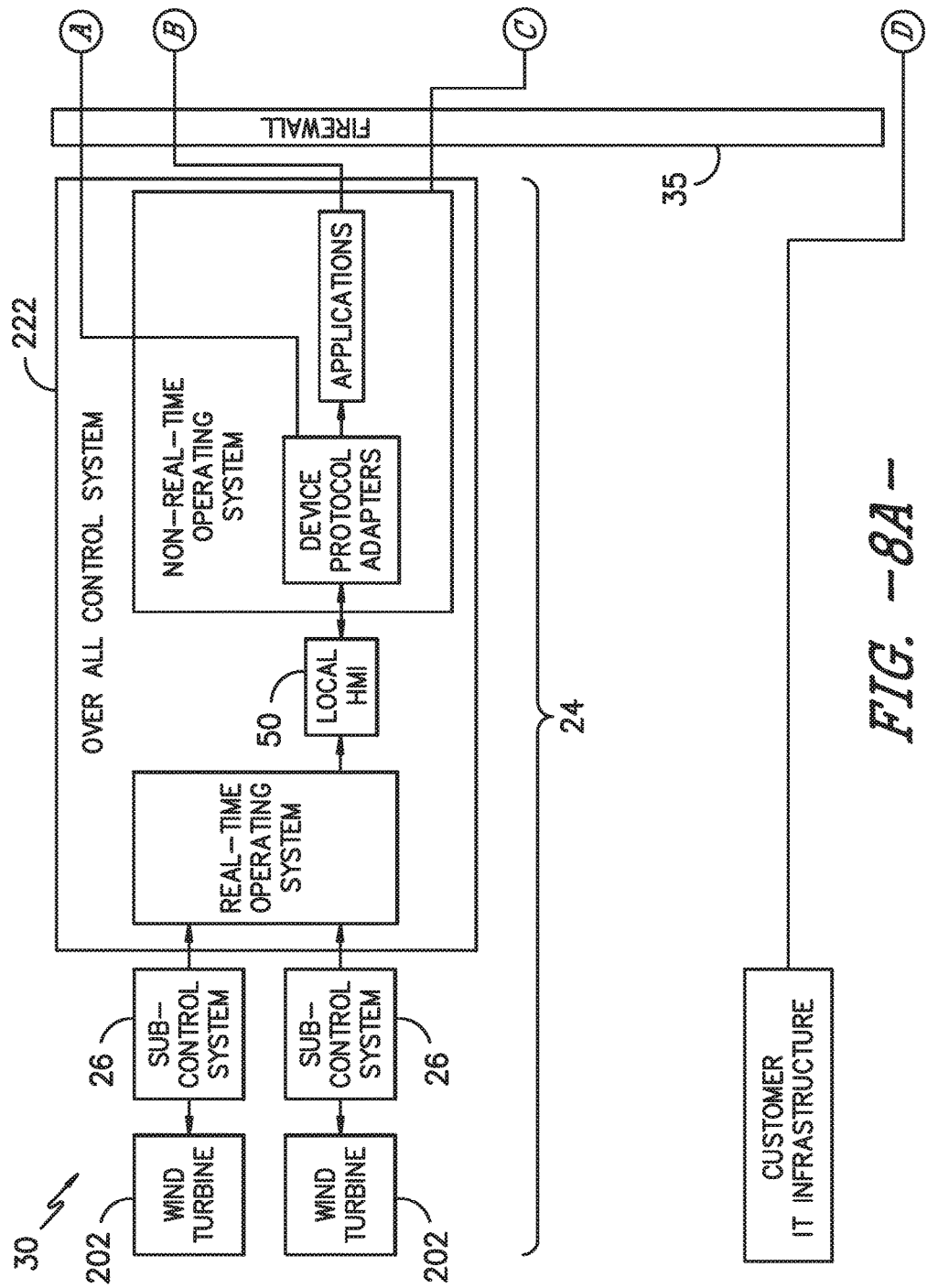
FIG. -8A-

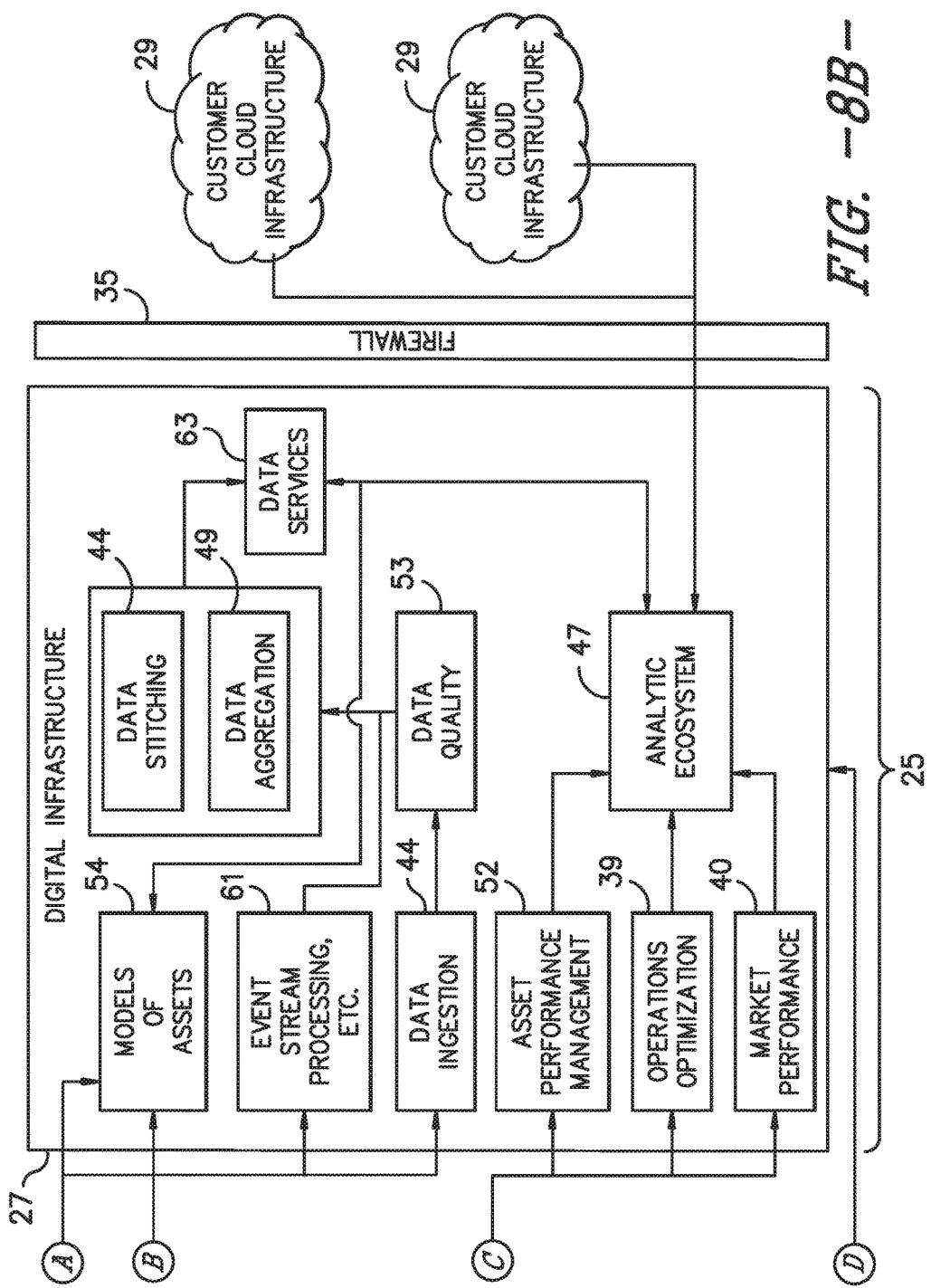
FIG. -8B-

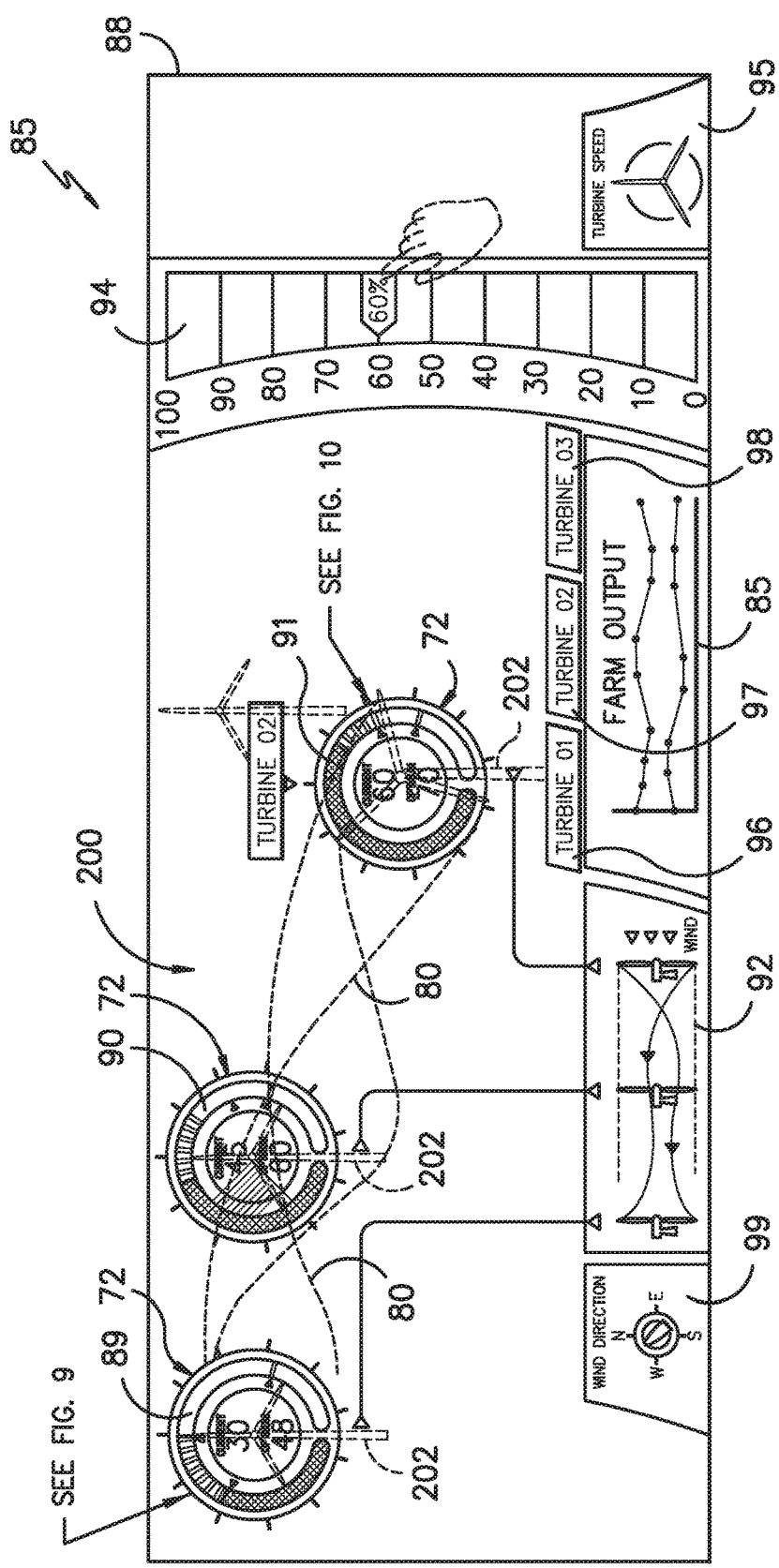
FIG. -9-

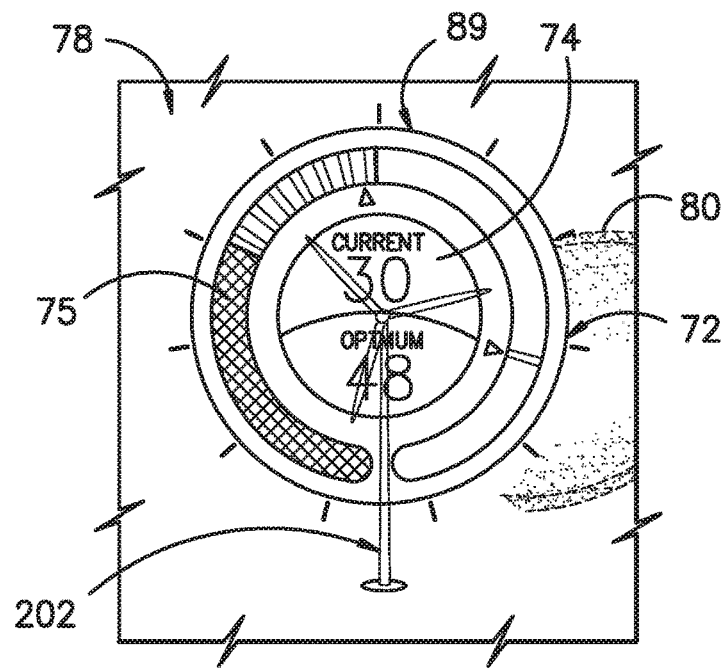
FIG. -10-
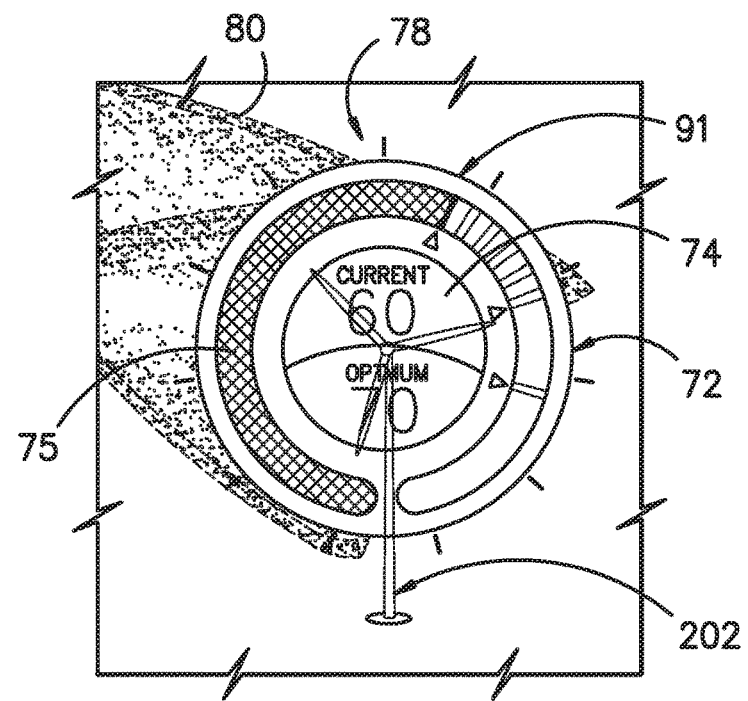
FIG. -11-

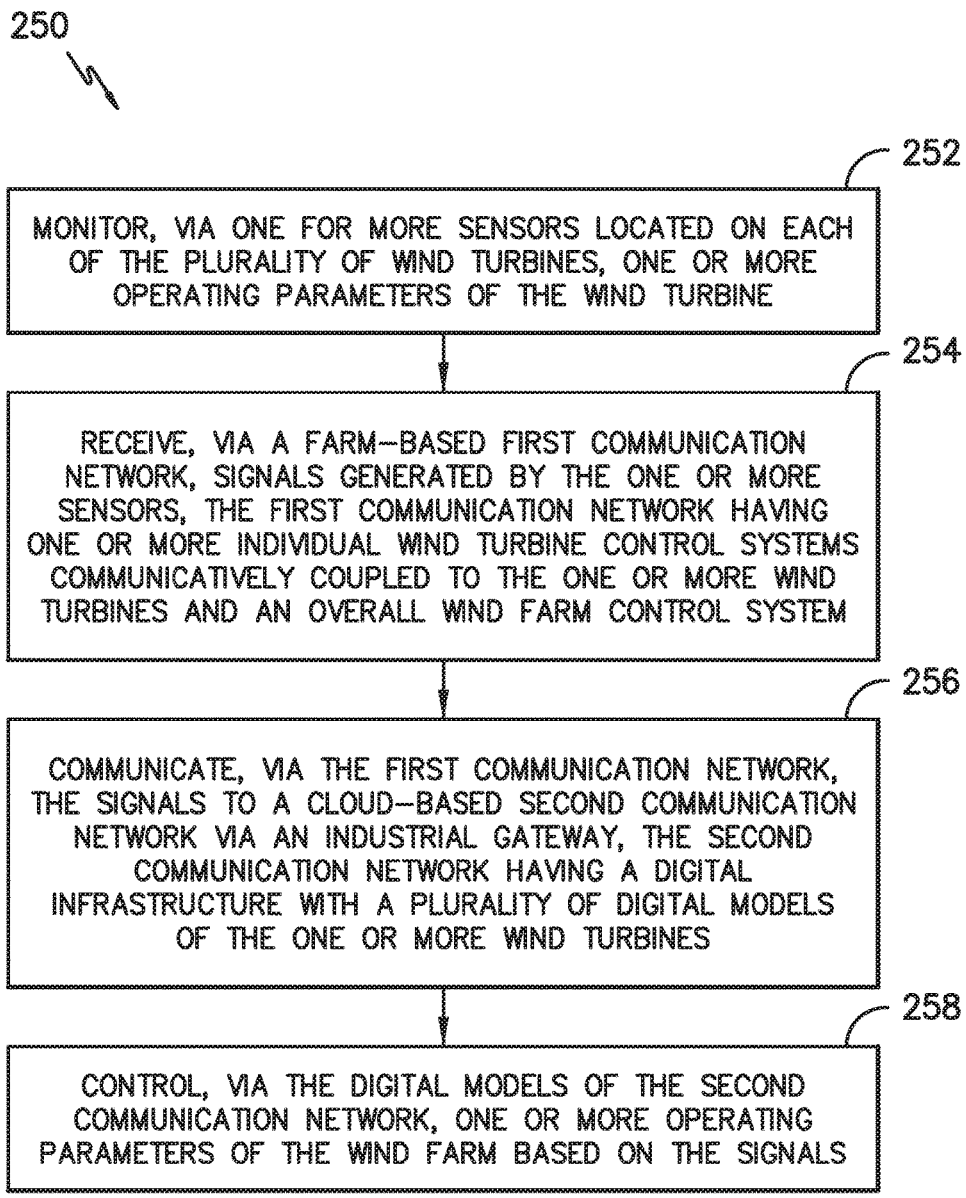
FIG. -12-

DIGITAL SYSTEM AND METHOD FOR MANAGING A WIND FARM HAVING PLURALITY OF WIND TURBINES COUPLED TO POWER GRID

RELATED APPLICATION

The present application is a continuation-in-part application of U.S. application Ser. No. 14/964,677 entitled "Digital Twin Interface for Operating Wind Turbines" filed on Dec. 10, 2015, which claims priority to U.S. Provisional Application Ser. No. 62/162,547 filed on May 15, 2015, both of which are incorporated herein in their entirety by reference hereto.

FIELD OF THE INVENTION

The present application relates generally to the technical field of wind farms. More specifically, the present application relates to a digital twin interface for operating wind farms.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid. Such configurations may also include power converters that are used to convert a frequency of generated electric power to a frequency substantially similar to a utility grid frequency.

A plurality of wind turbines are commonly used in conjunction with one another to generate electricity and are commonly referred to as a wind farm. Wind turbines on a wind farm typically include their own meteorological monitors that perform, for example, temperature, wind speed, wind direction, barometric pressure, and/or air density measurements. In addition, a separate meteorological mast or tower ("met mast") having higher quality meteorological instruments that can provide more accurate measurements at one point in the farm is commonly provided.

Many wind turbines employ human machine interaction interfaces (HMIs), which typically include simple command based systems, or simple graphic user interfaces leveraging the selection of options through menus, entry of specific pieces of data, and the ability to review sensor data from individual assets or the overall performance of an integrated system. Wind farms, however, can be extremely complex and the performance of such farms is often the result of the interactions of all the assets within the farm (which themselves may differ in their unique characteristics), the settings for each turbine (e.g., blade angle), the physical position of each turbine within the farm, unique moment by moment conditions (e.g., wind direction and other weather conditions), and even predictive maintenance schedules of the turbines.

Thus, a digital wind farm system and method for managing a wind farm would be welcomed in the art. More specifically, a system and method that provides a simpler and more effective way for users to make decisions needed to optimize performance of the wind farm over time, as well as to adapt to changing conditions would be advantageous.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a digital system for managing a wind farm having a plurality of wind turbines electrically coupled to a power grid. The system includes a farm-based first communication network having one or more individual wind turbine control systems communicatively coupled to the one or more wind turbines and an overall wind farm control system. The system also includes a cloud-based second communication network communicatively coupled to the first communication network via an industrial gateway. The second communication network includes a digital infrastructure having a plurality of digital models of the one or more wind turbines. Thus, the digital models of the one or more wind turbines are continuously updated during operation of the wind farm via data supplied by the farm-based first communication network.

In another aspect, the present disclosure is directed to computer-implemented method for managing a wind farm having a plurality of wind turbines. The method includes monitoring, via one or more sensors located on each of the plurality of wind turbines, one or more operating parameters of the wind turbine. The method also includes receiving, via a farm-based first communication network, signals generated by the one or more sensors, the first communication network having one or more individual wind turbine control systems communicatively coupled to the one or more wind turbines and an overall wind farm control system. Another step includes communicating, via the first communication network, the signals to a cloud-based second communication network via an industrial gateway, the second communication network having a digital infrastructure with a plurality of digital models of the one or more wind turbines. Further, the method includes controlling, via the digital models of the second communication network, one or more operating parameters of the wind farm based on the signals.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine according to the present disclosure;

FIG. 2 illustrates a schematic view of one embodiment of a controller for use with the wind turbine shown in FIG. 1;

FIG. 3 illustrates a schematic view of one embodiment of a wind farm according to the present disclosure;

FIG. 4 illustrates a block diagram of one embodiment of various components of a digital wind farm according to the present disclosure;

FIG. 5 illustrates a block diagram of one embodiment of a various components of a digital twin interface of a digital wind farm according to the present disclosure;

FIG. 6 illustrates a block diagram of another embodiment of various components of a digital wind farm according to the present disclosure;

FIG. 7 illustrates a flow chart of one embodiment of a user interacting with a digital wind farm according to the present disclosure;

FIG. 8A illustrates a partial block diagram of another embodiment of various components of a digital wind farm according to the present disclosure;

FIG. 8B illustrates a partial block diagram of another embodiment of various components of a digital wind farm according to the present disclosure;

FIG. 9 illustrates a schematic diagram of one embodiment of a digital twin interface of a wind farm according to the present disclosure;

FIG. 10 illustrates a schematic diagram of one of the digital representations of the wind turbines within the digital twin interface of the wind farm of FIGS. 8A and 8B;

FIG. 11 illustrates a schematic diagram of another one of the digital representations of the wind turbines within the digital twin interface of the wind farm of FIGS. 8A and 8B;

FIG. 12 illustrates a flow diagram of a method for managing a wind farm having a plurality of wind turbines according to the present disclosure;

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a digital wind farm system for managing a wind farm having a plurality of wind turbines electrically coupled to a power grid. The digital system includes a farm-based first communication network having one or more individual real-time wind turbine control systems communicatively coupled to the one or more wind turbines and an overall wind farm non-real-time control system. The system also includes a cloud-based second communication network communicatively coupled to the first communication network via an industrial gateway. More specifically, the cloud-based second communication network includes a digital infrastructure having a plurality of digital models of the one or more wind turbines. Thus, the digital models of the one or more wind turbines are continuously updated during operation of the wind farm via data supplied by the farm-based first communication network. Accordingly, the digital wind farm system provides an overall systems level concept.

The various embodiments of the system and method described herein provide numerous advantages not present in the prior art. For example, wind farms are extremely complex and performance of such is the result of interactions of all the assets within the farm. For example, the settings for each turbine (e.g., blade angle), the physical position of each turbine within the farm, the unique moment by moment conditions (e.g., wind direction and other weather conditions), and even predictive maintenance schedules, all effect the performance of the wind farm. As such, the model-based system of the present disclosure provides a simpler and more effective way for users to make the decisions needed to optimize performance of the farm over time and allows the user to manage the wind farm even with changing conditions. Further, the present disclosure is configured to integrate machine learning analytics into the operation and optimization of the wind farm, incorporate both the unique intellectual capital from manufacturers who have data that informs and improves on the physics of their turbines, as well as incorporate the unique experience of an operator (who understands the properties of their own local farm conditions, configuration, and/or operating plan). Thus, the present disclosure specifies unique interaction techniques for a wind farm model-based interface that leverages the concept of a digital twin of the farm and its assets.

Further, the system and method of the present disclosure digitally extends the various sub systems that exist in the wind farm to the cloud, thereby enabling the wind farm to act and behave as one cohesive unit. As such, the system of the present disclosure provides seamless communication end to end and enables sharing of intelligence and tools throughout the wind farm for effective, optimized and profitable operation.

Referring now to the drawings, FIG. 1 illustrates a perspective view of one embodiment of a wind turbine 10 configured to implement the control technology according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced. The generators are sometimes, but not always, rotationally coupled to the rotor 18 through a gearbox. Thus, the gearbox is configured to step up the inherently low rotational speed of the rotor for the generator to efficiently convert the rotational mechanical energy to electric energy. Gearless direct drive wind turbines also exist. The generated electric power is transmitted to an electric grid via at least one electrical connection. Such known wind may be coupled to the electric grid via a known full power conversion assembly. More specifically, full power conversion assemblies may include a rectifier portion that converts alternating current (AC) generated by the generator to direct current (DC) and an inverter that converts the DC to AC of a predetermined frequency and voltage amplitude.

The wind turbine 10 may also include a wind turbine controller 26 centralized within the nacelle 16. However, in other embodiments, the controller 26 may be located within any other component of the wind turbine 10 or at a location outside the wind turbine. Further, the controller 26 may be communicatively coupled to any number of the components of the wind turbine 10 in order to control the operation of such components and/or to implement a control action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes of the wind turbine 10 (e.g., start-up or shut-down sequences), de-rate or up-rate the wind turbine 10, control various components of the wind turbine 10, and/or implement the various method steps as described herein.

For example, in certain embodiments, the methods described herein may be at least partially processor-implemented. The performance of certain of the operations may be distributed among the one or more processors, not only residing within a single machine, but deployed across a number of machines. The one or more processors may also operate to support performance of the relevant operations in a "cloud computer" environment or as a "software service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

In additional embodiments, the controller 26 may be configured to control the blade pitch or pitch angle of each of the rotor blades 22 (i.e., an angle that determines a perspective of the rotor blades 22 with respect to the direction of the wind) to control the power output generated by the wind turbine 10. For instance, the controller 26 may control the pitch angle of the rotor blades 22 by rotating the rotor blades 22 about a pitch axis 28, either individually or simultaneously, by transmitting suitable control signals to a pitch drive or pitch adjustment mechanism (not shown) of the wind turbine 10.

Referring now to FIG. 2, a block diagram of one embodiment of suitable components that may be included within the individual wind turbine controller 26 (or farm controller 222) is illustrated in accordance with aspects of the present disclosure. The controller(s) 26, 222 may operate as a standalone device or may be coupled (e.g., networked) to other machines. In a networked deployment, the controller 26 may operate in the capacity of a server machine or a client machine in a server-client network environment, or as a peer machine in a peer-to-peer (or distributed) network environment. By way of non-limiting example, the controller 26 may include or correspond to a server computer, a client computer, a personal computer (PC), a tablet computer, a laptop computer, a netbook, a mobile device, or any machine capable of executing the instructions 216, sequentially or otherwise, that specify actions to be taken by machine 200.

As shown, the controller 26 may include one or more processor(s) 58 and associated memory device(s) 60 (and/or input/output (I/O) components, not shown) configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, application-specific processors, digital signal processors (DSPs), Application Specific Integrated Circuits (ASICs), Field Programmable Gate Arrays (FPGAs), and/or any other programmable circuits. Further, the memory device(s) 60 may generally include memory element(s) including, but are not limited to, computer readable medium (e.g., random access memory (RAM)), computer readable non-volatile medium (e.g., a flash memory), one or more hard disk drives, a floppy disk, a compact disc-read only memory (CD-ROM), compact disk-read/write (CD-R/W) drives, a magneto-optical disk (MOD), a digital versatile disc (DVD), flash drives, optical drives, solid-state storage devices, and/or other suitable memory elements.

Additionally, the controller 26 may also include a communications module 62 to facilitate communications between the controller 26 and the various components of the wind turbine 10. For instance, the communications module 62 may include a sensor interface 64 (e.g., one or more analog-to-digital converters) to permit the signals transmitted by one or more sensors 65, 66, 67, 216, and 218 to be converted into signals that can be understood and processed by the controller 26. Furthermore, it should be appreciated that the sensors 65, 66, 67, 216, 218 may be communicatively coupled to the communications module 62 using any suitable means. For example, as shown in FIG. 2, the sensors 65, 66, 67, 216, 218 are coupled to the sensor interface 64 via a wired connection. However, in alternative embodiments, the sensors 65, 66, 67, 216, 218 may be coupled to the sensor interface 64 via a wireless connection, such as by using any suitable wireless communications protocol known in the art. For example, the communications module 62 may include the Internet, a local area network (LAN), wireless local area networks (WLAN), wide area networks (WAN) such as Worldwide Interoperability for Microwave Access (WiMax) networks, satellite networks, cellular networks, sensor networks, ad hoc networks, and/or short-range networks. As such, the processor 58 may be configured to receive one or more signals from the sensors 65, 66, 67, 216, 218.

The various components of the controller 26, e.g. I/O components, may include a wide variety of components to receive input, provide output, produce output, transmit information, exchange information, capture measurements, and so on. The specific I/O components that are included in a particular machine will depend on the type of machine. For example, portable machines such as mobile phones will likely include a touch input device or other such input mechanisms, while a headless server machine will likely not include such a touch input device. Further, the I/O components may be grouped according to functionality merely for simplifying the following discussion and the grouping is in no way limiting. In further embodiments, the I/O components may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. In additional embodiments, the I/O components may include alphanumeric input components (e.g., a keyboard, a touch screen configured to receive alphanumeric input, a photooptical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

The sensors 65, 66, 67, 216, 218 may be any suitable sensors configured to measure any operating data points of the wind turbine 10 and/or wind parameters of the wind farm 200 (FIG. 3). For example, the sensors 65, 66, 67, 216, 218 may include blade sensors for measuring a pitch angle of one of the rotor blades 22 or for measuring a loading acting on one of the rotor blades 22; generator sensors for monitoring the generator (e.g. torque, rotational speed, acceleration and/or the power output); and/or various wind sensors for measuring various wind parameters (e.g. wind speed, wind direction, etc.). Further, the sensors 65, 66, 67, 216, 218 may be located near the ground of the wind turbine 10, on the nacelle 16, on a meteorological mast of the wind turbine 10, or any other location in the wind farm 200.

It should also be understood that any other number or type of sensors may be employed and at any location. For example, the sensors may be accelerometers, pressure sensors, strain gauges, angle of attack sensors, vibration sensors, MIMU sensors, camera systems, fiber optic systems, anemometers, wind vanes, Sonic Detection and Ranging (SODAR) sensors, infra lasers, Light Detecting and Ranging (LIDAR) sensors, radiometers, pitot tubes, rawinsondes, other optical sensors, and/or any other suitable sensors. It should be appreciated that, as used herein, the term "monitor" and variations thereof indicates that the various sensors of the wind turbine 10 may be configured to provide a direct measurement of the parameters being monitored or an indirect measurement of such parameters. Thus, the sensors 65, 66, 67, 216, 218 may, for example, be used to generate signals relating to the parameter being monitored, which can then be utilized by the controller 26 to determine the actual condition.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (e.g., as a special-purpose processor, such as a field programmable gate array (FPGA) or an application specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

At least some of the known wind turbines are physically positioned in a remote geographical region or in an area where physical access is difficult, such as, off-shore installations. These wind turbines may be physically nested together in a common geographical region to form a wind turbine farm and may be electrically coupled to a common AC collector system. For example, as shown in FIG. 3, one embodiment of a wind farm 200 that may be controlled according to the present disclosure is illustrated. More specifically, as shown, the wind farm 200 may include a plurality of wind turbines 202, including the wind turbine 10 described above communicatively coupled to a farm controller 222 via a network 226. For example, as shown in the illustrated embodiment, the wind farm 200 includes twelve wind turbines, including wind turbine 10. However, in other embodiments, the wind farm 200 may include any other number of wind turbines, such as less than twelve wind turbines or greater than twelve wind turbines. In one embodiment, the controller 26 of the wind turbine 10 may be communicatively coupled to the farm controller 222 through a wired connection, such as by connecting the controller 26 through suitable communicative links (e.g., a suitable cable). Alternatively, the controller 26 may be communicatively coupled to the farm controller 222 through a wireless connection, such as by using any suitable wireless communications protocol known in the art. In addition, the farm controller 222 may be generally configured similar to the controllers 26 for each of the individual wind turbines 202 within the wind farm 200.

In several embodiments, one or more of the wind turbines 202 in the wind farm 200 may include a plurality of sensors for monitoring various operating data points or control settings of the individual wind turbines 202 and/or one or more wind parameters of the wind farm 200. For example, as shown, each of the wind turbines 202 includes a wind sensor 216, such as an anemometer or any other suitable device, configured for measuring wind speeds or any other wind parameter. In one embodiment, the wind parameters may include information regarding at least one of or a combination of the following: a wind gust, a wind speed, a wind direction, a wind acceleration, a wind turbulence, a wind shear, a wind veer, a wake, SCADA information, or similar.

As is generally understood, wind speeds may vary significantly across a wind farm 200. Thus, the wind sensor(s) 216 may allow for the local wind speed at each wind turbine 202 to be monitored. In addition, the wind turbine 202 may also include one or more additional sensors 218. For instance, the sensors 218 may be configured to monitor electrical properties of the output of the generator of each wind turbine 202, such as current sensors, voltage sensors, temperature sensors, or power sensors that monitor power output directly based on current and voltage measurements. Alternatively, the sensors 218 may include any other sensors that may be utilized to monitor the power output of a wind turbine 202. It should also be understood that the wind turbines 202 in the wind farm 200 may include any other suitable sensor known in the art for measuring and/or monitoring wind parameters and/or wind turbine operating data points.

Referring now to FIGS. 4, 8A, and 8B, schematic views of various embodiments of components that may be included in a digital wind farm 30 according to the present disclosure is illustrated. As shown, in certain embodiments, the digital wind farm 30 includes a farm-based first communication network 24 that encompasses one or more wind turbines 202 configured to generate power. Further, as shown particularly in FIG. 8A, each of the wind turbines 202 includes an individual wind turbine control system 26 communicatively coupled to the one or more wind turbines 202 and an overall wind farm control system 222. The individual wind turbine control systems are configured for real-time control of each of the wind turbines 202, whereas the overall wind farm control system 222 may operate in real-time or non-real-time. In addition, the overall wind farm control system 222 may include the associated Supervisory Control and Data Acquisition (SCADA) system and/or industrial gateway controls (e.g. a centralized method of communicating with the site).

Further, the overall wind farm control system 222 may be configured to collect different kinds of data points in the digital farm 30 under different load conditions, at regular configurable intervals. The data collected helps in understanding of how the wind farm 200 operates under varying load conditions. These data points are then securely transmitted to a cloud hosted application that does complex analyses to recommend a safe operating range for enhance power production. The data that is collected by the overall wind farm control system 222 can then be fed into a digital twin interface (e.g. FIG. 9) to continuously model and update the various digital models.

Extensibility to collect data from different types of assets is achieved by modularizing data collection in the form of adapters. Thus, as shown in FIG. 8A, the overall wind farm system 222 may include device protocol adapters as well as various applications. More specifically, each protocol has its own adapters to be able to connect, authenticate and subscribe to data streams from to in an extensible manner. Further, certain adapters may be built and deployed to have advanced remote management capabilities to be able to monitor, update configuration, upgrade software modules, etc. which allows for remote deployment of new adapters to communicate with new devices on the site.

Once the data is collected from equipment, some critical, high value analytics are performed on the raw data to identify critical events. Once the overall wind farm system 222 identifies critical events, the gateway is configured to handle events and notification in a manner that is most appropriate for the site and plant. These analytics are in addition to the ones that run on controllers and SCADA servers. Such edge analytics are more sophisticated and can fully leverage the processing power of the gateway. As the gateway is built to be in synchronization with cloud system, events identified locally are also aggregated with the cloud solution. Further, since the edge gateway and its counterpart in the cloud act as a unified system, they also share updated analytic engines, rules and models to effectively identify anomalies earlier and closer to the source.

Moreover, the digital wind farm 30 includes a cloud-based second communication network 25 communicatively coupled to the first communication network 24 via an optional industrial gateway 33. More specifically, as shown, the cloud-based second communication network 25 includes a digital infrastructure 27 having a plurality of digital models 54 of the one or more wind turbines 202. As such, the plurality of digital models of the wind turbines 202 may be continuously updated during operation of the wind farm 200 via data supplied by the farm-based first communication network 25. Thus, as shown in the illustrated embodiment, the digital wind farm 30 is configured to provide an overall systems-level view of an end-to-end ecosystem of all associated components within the wind farm 200. As such, each of the system components may have a dedicated responsibility and certain responsibilities as part of the ecosystem.

More specifically, as shown in FIG. 4, the digital infrastructure 27 of the digital wind farm 30 may include a time series data store 31, one or more wind turbines 202 as described herein, a SCADA system 32, an industrial gateway 33, a power grid 34, an industrial firewall 35, and a plurality of digital models executing on one or more processors 58 (FIG. 2). For example, as shown, the various digital models may include software modules such as a demand forecast module 36, a wind forecast module 37, a business driver-based modeling module 38, an operations optimization module 39, a market performance module 40, a visualization or user interface module 50, an anomaly detection module 41, a real-time analytics module 42, and analytic catalog module 43, an analytics engine module 47, one or more data stores 46, a mesoscale data module 51 (e.g., stored in a database), a data ingestion module 44, a historical operational data module 48 (e.g., stored in a database), a data stitching module 45, a data aggregation module 49, or any other suitable module. In addition, in certain embodiments, any one or more modules may be combined. Further, one or more modules may be part of cloud computing.

In addition or alternatively, as shown in FIG. 8B, the digital infrastructure 27 of the digital wind farm 30 may include a cloud-based communication network 25 separated from the first communication network 24 via an additional industrial firewall 35. Further, the cloud-based communication network 25 includes a plurality of digital models that may be executed on one or more processors 58 (FIG. 2). For example, as shown, the various digital models may include a model of assets 54, an event stream processing module 61, a data ingestion module 44, an asset performance management module 52, an operations optimization module 39, a market performance module 40, a data stitching module 45, a data aggregation module 49, a data quality 53 module, an analytics ecosystem module 47, or any other suitable module. In addition, in certain embodiments, any one or more modules may be combined. Further, one or more modules may be part of cloud computing. Further, as shown, the system 30 may also include a customer cloud-based infrastructure 29 communicatively coupled to the second communication network 25 and an additional firewall 35 configured between the second communication network 25 and the customer cloud-based infrastructure 29.

In one embodiment, the time series data store 31 may include a software storage system optimized to store a series of data values and quality of the data values indexed by a time range. These time series data may store and use proprietary compression algorithms to optimally store data points and also provide the capability to interpolate between two time periods. The intelligent wind turbine(s) 202 may be any suitable wind turbine as described herein (e.g. as shown in FIG. 1) or any other rotating machinery that converts fluid flow to useful energy, which can then be converted to electrical energy for storage and transmission. Further, the intelligent wind turbine(s) 202 may also include sophisticated sensors (e.g. 216, 218) and processing capabilities in-built with the turbine for the SCADA system to collect data from and stream back to the cloud. Further, the SCADA system 32 is configured to provide on-site communications for operators to be able to retrieve data from turbines and/or to interact with the control system.

Still referring to FIG. 4, the industrial gateway module 33 may be a secure appliance that is extensible to run sophisticated jobs locally on site for purposes of expediency and efficiency. Such a gateway module 33 is configured to provide bi-directional communication and enable operator(s) to remotely configure set points on the control system thru the on-site SCADA system 32. Further, the industrial gateway module 33 may optionally include a data collector, edge analytics, and/or a watchdog. The data collector may be a central point of interaction with the on-site SCADA system 32 to retrieve data in a flexible and configurable manner. Parameters of data collection (e.g. tags, frequency, etc.) can be configured remotely from the cloud. The edge analytics may include an analytics engine that can be configured (e.g., programmed) to run sophisticated critical analytics that are time sensitive. Secure bi-directional connectivity may allow newer algorithms to be pushed down to the gateway from cloud. The watchdog may be a daemon process or method that monitors (e.g., constantly or intermittently) values of configuration parameters on the SCADA system 32 and alerts support personnel when it detects unauthorized changes. This may provide added security against cyber-attacks.

In additional embodiments, as shown in FIG. 4, the power grid 34 may be connected to the wind farm 200 (FIG. 3). As the wind turbines 202 only respond to wind, their contribution to the system may be random. Thus, communication with the grid 34 may assist wind farm operators to effectively manage the power that is being generated by the farm 200.

The industrial firewall module 35 may include specialized firewall appliances built for systems that are aimed at inhibiting (e.g., preventing) and detecting cyberattacks closer to the time of intrusion. Further, the demand forecast module 36 may be a tool (e.g., a software tool) configured to predict demand for electricity using historical demand cycles, current consumption trends, and/or indicators for huge upcoming demand. Such a tool may assist operators in determining when to bring units online, e.g. for economic gain while operating equipment under favorable environmental conditions. The wind forecast module 37 may be a tool (e.g., a software tool) to predict wind conditions in particular geographical area for certain duration of time, using historical weather and/or wind data to predict within a margin of error.

The business driver-based modeling module 38 may be a set of software tools that translate wind forecast and demand forecast into operating models that can be leveraged by other software tools like "Market Performance" to help power plants maximize their gain while still maintaining optimal operating conditions. The operations optimization module 39 may be a software solution (e.g., software application) that uses algorithms (e.g., sophisticated algorithms), current and historical operating data, manufacturer's asset data, industry data references to suggest operating conditions and condition-based maintenance recommendations for enhanced (e.g., optimal) operation of equipment. Further, some of the data sources may reside in a customer's infrastructure, whereas other data may be leveraged from publicly available data sources either thru purchase of subscription. Access to this data source implies secure access to data customer infrastructure, that can audited and controlled by the customer. A combination of optimization techniques can be simulated using the digital twin module 54, and results are evaluated and validated using the digital twin module 54.

Referring to FIGS. 4, 5, and 8, the user interface or visualization module 50 (i.e. Local HMI) may include an Asset Performance Monitoring (APM) module 52 and a digital twin module 54. More specifically, in an example embodiment, the APM 52 may be a software suite of applications configured to enable the visualization of operation of power generation equipment, balance of plant equipment, alarms and alerts, case management, etc. In addition, the digital twin module 54 may be configured to allow remote operators to model and simulate turbines 202 by applying different models and loads on the equipment. Further, the digital twin module 54 may also be configured to allow remote and/or on-site configuration of units through the turbines 202 and on-site SCADA.

The equipment in the wind farm 200 is generally built and configured to operate within operating parameter range, although there is usually a range to which such equipment can be extended to safely operate in, without adversely affecting their safety and lifespan. As such, the digital system 30 is configured to continuously collect samples of specific configurable data sets, which can then be streamed to the cloud. Once in cloud, a series of complex computations are made in a highly parallelized environment. The results of such computations are then used to set the parameters for optimal operation of the equipment while still in the safe operation zone. Equipment performance for different settings can be simulated using the digital twin module 54, and lifecycle assessment repeated for new set of operating conditions. This process is repeated until desired performance can be achieved while still operating equipment under safe conditions.

Thus, the digital twin module 54 is configured to begin with a baseline definition that is created during time of manufacture and is continuously updated by ingesting and analyzing data from the field, machine learning that is gained from studying such data streams, and patterns of behavior that are identified. In addition, any of the other modules described herein may also feed into the digital twin module 54, thereby keeping the model in sync with the asset on the field.

Performing such complex computations in the cloud offers various advantages since the cloud environment is highly scalable and the analytic engine module 47 acts as the brain of the whole fleet, thereby enabling sharing of learnings between various wind farms for comparison of By digitizing the entire wind farm and fleet, all learnings and information flow freely between systems for optimal decision making and operation.

In addition, the digital twin module 54, the operations optimization module 39, and the lifecycle assessment (i.e. continuously collecting and updating the digital models) are used in conjunction with each other in a closed loop system, to tweak different parameters, simulate operation of the digital farm 30 under changed conditions and observing behavior. Once desired performance is achieved by tweaking operating parameters and set points and validated using the digital twin module 54, these set points and configurations are replicated on the onsite controllers directly or thru the SCADA system where feasible.

The digital twin module 54 and the operations optimization module 39 may also recommend optimal operating parameters and settings based on market conditions. For example, as shown, the market performance module 40 may be a software solution (e.g., software application) configured to provide recommendations to operators of power generating equipment about when to bring units online for economic gain while operating equipment under favorable environmental conditions. More specifically, the market performance module 40 is configured to evaluate various market parameters, such as demand/supply from the grid, price for power produced, etc. to recommend a power generation target. The operations optimization module 39 utilizes the targets as recommended by the market performance module 40 for its processing. As such, the digital system 30 provides a closely integrated system of all components which continuously analyze incoming data, market conditions, load data, environmental factors and feed each other for optimized decision making. As the digital system 30 resides in the cloud, any and all learnings across all plants in a fleet and fine tune performance with minimal human intervention.

Referring still to FIGS. 4 and 8, the anomaly detection module 41 may be a system that collects wind farm and fleet data from numerous (e.g. hundreds) of turbine sensors and key SCADA control parameters. Further, the anomaly detection module 41 is configured to run a plurality (e.g. several hundreds) of rules (e.g., unique rules) and/or algorithms, e.g. 24 hours a day to detect and/or prioritize anomalies in wind turbine operations and to identify the proper course of corrective action.

The real-time analytics module 42 may be a software analytics tool kit configured to create analytics, validate against operating data set to determine the need for change in turbine operating parameters. Such analytics can be pushed to the industrial gateway module 33 so as to remotely configure turbine parameters. In an example embodiment, the analytics catalog module 43 is configured to provide a catalog of searchable, configurable and editable algorithms for reuse. The analytics engine module 47 may be configured to provide an ecosystem that allows for pluggable data sources, analytics and an analytic runtime environment. The data store(s) 46 may store data and be a conventional database arrangement, e.g. similar to the memory device(s) 60 described in FIG. 2. Further, in an example embodiment, the mesoscale data 51 is configured to store historical weather data for different geographical regions. The data ingestion module 44 provides functionality to ingest data from different data sources ideally in a fast, reliable manner that retains data integrity and granular fidelity. The historical operational data module 48 may include operational data of proprietary equipment and non-proprietary equipment over a period of time. The data stitching module 49 may be configured to integrate and/or correlate data from different and disparate data sources. The data aggregation module 49 may aggregate data from different and disparate data sources. To add a richer context and value to the data that is collected, stitched and aggregated from various sources, the ecosystem supports sophisticated analytics. The analytics ecosystem 47 comes with an analytic catalog that in addition to providing key out-of-box analytics for consumption also provides ability for customers to add their own analytics to the catalog. These analytics could be chosen to run on demand or on a scheduled basis.

Referring now to FIG. 6, a simplified block diagram of one embodiment of a digital wind farm 30 according to the present disclosure is illustrated. More specifically, as shown, the diagram depicts a digital twin interface for managing wind farms that can, for example, be used to enhance (ideally optimize) performance of a plurality of wind turbines 202 of a wind farm 200. Thus, the system of FIG. 6 may increase customer satisfaction and value by simplifying the process of real-time optimization of a wind farm 200, and supporting ongoing operations, maintenance and growth of the farm 200. Further, the system provides, in some example embodiments, a model-based interface that can be extended to support new analytics and other services to customers.

More specifically, as shown, the digital wind farm 30 of FIG. 6 includes a plurality of wind turbines 202, a farm control system 57, a virtual control system 59, a machine-learning analytics engine 47, a model-based HMI 56, and a plurality of digital twin turbines 55. In an example embodiment, the digital wind farm 30 of FIG. 6 assumes a set of turbines with SCADA or equivalent elements, associated with the digital wind farm 30 (e.g., also SCADA-based). Such a digital wind farm 30 may also include sensor inputs from throughout the farm 200 as well. The digital wind farm 30 in turn may be associated with the virtual control system 30 that has a digital twin view of the farm 200.

In an example embodiment, the digital twin turbines 55 are representations of the physical assets that include the physics-based models for the specific models of each asset, the unique operating characteristics and/or data that have been accumulated for each asset, current settings, and/or other information. Further, the virtual control system 59 may include a systems model of how the integrated system of assets are likely to operate, and how changing the characteristics of a subset of the assets is likely to affect the other assets as well as farm performance in general. The analytics engine 47, such as the ABM associated with the farm 30, may support analytics for more effective modeling as it learns about the operation of the farm 200 over time and the interactions, as well as supporting new analytics services to improve the ability of the user to operate their farm optimally over time.

More specifically, the data collected from onsite devices can be streamed at different data rates and resolution (e.g. via the analytics engine 47) to data ingestion services running in the cloud. This data transmission can be accomplished via multiple means including but not limited to web service calls, message queues, HTTP post mechanism, or similar. The data that is collected can range from operational data like tag data, event data or data from extraneous sources like meteorological data. Further, the cloud infrastructure hosts several technologies for stitching and aggregating data from other sources like central historian, global asset database, historical events etc. Once the data has been aggregated, it can be stored in a variety of data stores. The storage technology is optimized for the nature of data and the querying and processing requirements.

Referring still to FIG. 8B, all client applications of data can be shielded from the complexities of interacting with different storage technologies via the data services module 63. This enables upgrade of technologies and upgrading of services without interfering with any of the client applications. Real-time analytics may then be performed as the data is being streamed in parallel of being sent for storage. Analytics are suggested to be performed at different stages to capture anomalies and detect patterns of different criticality. Machine-learning analytics can also continuously monitor incoming data to detect patterns of data. In certain embodiments, the virtual control system 59 and the analytics engine 47 uses or incorporate externally available data about weather patterns and other conditions to combine with the data coming from sensors and from the physical assets.

Traditionally, human machine interaction interfaces for power systems have been simple command based systems, or simple graphic user interfaces leveraging the selection of options through menus, entry of specific pieces of data, and the ability to review sensor data from individual assets or the overall performance of an integrated system. As mentioned, however, wind farms are extremely complex and performance is the result of the interactions of all the assets/equipment within the farm 200. Thus, the mode-based human machine interface 56 according to the present disclosure is configured to provide a simpler and more effective way for users to make the decisions needed to optimize performance of a farm over time, and to adapt to changing conditions.

Some example embodiments build on an integrated and dynamic digital representation of behaviors of at least one wind turbine 202 in the wind farm 200 that obtains real-time and predicative data from multi-channels environmental conditions, and generates recommendations of operational factors across-turbines in the wind farm in order to maximize overall productivity. The multi-channel environmental conditions may include not only the dynamics of microclimate change of the turbine on the specific terrain, but also the expected turbulence from the neighboring turbine upon their operational conditions and settings. Through digitalizing wind turbine behaviors with multi-channels dynamic updates, some of the methods and systems described herein are configured to treat each turbine 202 as an active agent in an agent-based model (ABM). Its behaviors may be dynamically influenced by the environmental changes and the behaviors of other agents that are the neighboring turbines in the wind farm 200. In one embodiment, the best combinations of operational settings can then be derived by an ABM simulator to provide recommendations of turbine operation in the wind farm 200, and maximize the overall throughput and productivity under the ever-changing situations.

Example underlying architecture of dynamic digital representation of behaviors of the wind turbine(s) 202 may leverage two classes of constructs. For example, one class of constructs may emphasize physical models of turbine and geological characteristics including blade shapes of the turbines and local terrains (e.g., the geographical terrain where the wind farm is located). Such a construct may also include aerodynamic models for specific shapes of turbine blades and the local terrain where the turbine is located. Computational fluid dynamics (CFD) may be applied to the models to simulate interactions of airflows with surfaces defined by boundary conditions of the blade and terrain shapes. The geo-relationships among the turbines 202 in the wind farm 200 may be modeled through stitching the local terrain around each turbine 202 and cross-referencing the global geographic data of the wind farm 200 to calibrate the overall precision.

Another example class of constructs may focus on data modeling and dynamic updates of the data. This example class of constructs may include measurements and operational settings from each turbine 202, as well as real-time and predicative data from multi-channels environmental conditions. The relationships among turbines 202 and their operational settings may be established based upon the overall asset hierarchy across turbines 202 and controls in the wind farm 200. In an example embodiment, the microclimate change and conditions for each turbine 202 are synthesized and interpreted from multiple sources. For example, the sources may include weather data and weather forecast of the area, sensors of surrounding turbines 202 and wind farm equipment, a level of turbulences attributed from neighboring turbines 202, or the like. More specifically, the level of turbulence may be derived from the CFD and geo-relationship described above, and dynamically updated upon the operational conditions and settings of their neighboring turbines.

The model-based HMI 56 may provide one or more views of the virtual, digital twin farm and the relevant states of the assets and system performance, a virtual HMI, and so on. Virtual controls accessed through the model-based HMI 56 may be translated by the virtual control system and supporting analytics, as applied to the digital twin assets into a specific set of commands that would be executed by the physical farm control system and turbines across the farm 200. Accordingly, in an example embodiment, directions provided by an operator can be modeled before executing them on the physical equipment in order to find the right combination of physical control settings needed to achieve the operator's goals.

In an example embodiment, interaction with a digital twin-based interface for controlling the wind farm 200 through the virtual control system 59 and intelligent analytics engine 47 (e.g., an ABM) may be implemented with a model that allows the user to interact with models of the assets themselves with controls that map to the user's model of the most critical elements of the asset operations. The aforementioned may provide feedback about the efficiency of the farm 30 as well as the variables that are most critical for optimizing the system. Examples of relevant design patterns include a turbine state controller, a turbine wake visualizer, the system optimization visualizer, and so on.

More specifically, as shown in FIG. 7, a flow chart 150 of one embodiment of a method of managing a wind farm 200 having a plurality of wind turbines 202 according to the present disclosure is illustrated. As shown at 151, a user (e.g. a wind farm owner) may interact with the virtual cloud-based control system 59. Further, as shown at 152, the user can retrieve information about the status of the turbines 202 and general information regarding farm performance of the wind farm 200, e.g. by reviewing the model-based representation of the farm 200 drawn of the digital twin and fleet models. In addition, as shown at 153, the user can compare the farm model performance against ideal targets, e.g. as defined by analytics within the cloud control system. More specifically, as shown at 154, the user can obtain recommendations about new parameter settings to improve performance and/or to push existing operating parameters closer to the targets.

Thus, as shown at 155, the user can model variations in settings to explore the pros and cons of multiple parameter settings. Accordingly, the user can determine whether a better performance and lifting balance can be achieved, given the owner's goals. When the optimal parameters for achieving the business goals are defined, the owner executes the changes, e.g. as shown at 156. As such, as shown at 157, the virtual cloud-based farm control system 57 is configured to convert the parameters into a series of commands for the fleet control system (158) and the specific commands needed for each of the physical turbine assets. At 159, the commands for the SCADA system 32 and the wind turbines 202 are sent to the individual wind turbine controllers 26. Further, as shown at 160 and 161, the new asset state information from the turbines 202, the performance of the wind farm 200, and the individual assets are sent to update the digital twin module 54 as well as the fleet models (not shown). The updated changes in performance status and lifting expectations can then be viewed by the user to further refine performance of the wind farm 200.

Referring now to FIGS. 9-11, various schematic diagrams of a digital twin interface 86 for managing a wind farm 200 having a plurality of wind turbines 202 is illustrated. More specifically, as shown, the digital twin interface 86 includes a graphical user interface (GUI) 88 that displays a digital equivalent of the wind farm 200. In addition, as shown, the GUI 88 may be in communication with a wind turbine state controller 72 of each of the wind turbines 202 in accordance with the present disclosure. For example, as shown, the digital equivalent of the wind farm 200 may include environmental information as well as a digital representation of each of the wind turbines 202 arranged in the wind farm 200.

More specifically, in one embodiment, the environmental information may include topographical information and/or site conditions. As such, the GUI 88 may include a background representing a geographical landscape in which the turbines 202 are located. Further, the digital representation of each of the wind turbines 202 may also include one or more control icons (e.g. 89, 90, and 91) arranged with each of the digital representations of the wind turbines 202, e.g. overlaying the wind turbines 202. More specifically, as shown, the control icons 89, 90, 91 of each wind turbine 202 may correspond to a control dial. Further, the control icon 89, 90, 91 of each digital representation of the wind turbines 202 may include information regarding current and/or optimum operating conditions of the digital wind turbines 202. For example, as shown in FIGS. 10 and 11, the control icons 89, 90, 91 may have an example current state (e.g., 30) and an example optimum state (e.g., 48).

The GUI 88 may also include one or more control features configured to optimize performance of the wind farm 200. For example, in certain embodiments, the control feature(s) may include one or more selection buttons 96, 97, 98. More specifically, each selection button 96, 97, 98 may correspond to one of the wind turbines 202 so as to allow a user to select one or more of the wind turbines 202 for at least one of monitoring or modifying operating conditions. For example, as shown, button 97 has been selected and corresponds to the wind turbine 202 associated with control icon 91. In further embodiments, each of the selection buttons 96, 97, 98 may be further associated with wind turbine information, including but not limited to any one of or a combination of a manufacturer of the wind turbine, age of the wind turbine, size of the wind turbine, historical information of the wind turbine, or similar.

In yet another embodiment, the control feature(s) may include at least one of a wind direction dial 99, a wind flow meter 92 illustrating the wind flow across the wind farm 200, a power output representation 85 of the wind farm 200, a turbine speed adjuster 94 configured to allow a user to modify a speed of a selected wind turbine 202, and/or a speed dial 95. Further, in the GUI 88, the blades 22 of the turbine 202 corresponding to the controller may be static or animated to represent the speed of operation of the blades 22. Thus, a user can visualize wake effects between the wind turbines 202, e.g. during or after operating parameters of the wind farm 200 have been modified. For example, as shown, the GUI 88 (or GUI 100) may include a wake representation 80, 110 between each of the wind turbines 202 of the wind farm 200, e.g. produced by the speed of the blades 22 and/or the direction of the wind 109. More specifically, as shown, the wake representation 80 may be illustrated streaming from the blades 22 of the turbine state controller 72 (represented by the including a wake visualizer). The direction of the wake 80 can be identical for all the turbine images, or it can indicate the direction of the wind as it flows through the turbine 202.

In addition, the GUI 88 of FIGS. 10-11 may also include a meter 75 that represents the current speed of the turbine 202. More specifically, as shown, the meter 75 is configured to indicate a speed of the turbine 202 to a user, e.g. so as to indicate current, optimal, and/or dangerous speed levels. Further, the meter 75 may be color-coded such that a user can be easily alarmed if, e.g. the wind turbine 202 is operating at a dangerous speed. Moreover, as shown, the numbers on the dial 74 may represent the power output. In other example embodiments, different colors may be used, and different visualizations for various key turbine parameters may be shown (e.g., fan blade angle, direction of the turbine, and so on).

It should also be understood that the control feature(s) may include any other suitable features that enables a user to modify wind farm parameters so as to optimize farm performance. In addition, it will be appreciated that the GUI 88 may display any number of turbines 202 and position the in the GUI 88 dependent upon their specific geographical location in the wind farm 200. Thus, as mentioned, each displayed turbine 202 may have a corresponding button. Controls for changing operating conditions of an associated turbine may change the values in the GUIs 88, as will feedback from sensors associated with the turbine 202. In example embodiments, environmental factors such as wind direction may change the image representation.

As mentioned above, the turbine icons can be arranged in a representation of the wind farm 200. Thus, the GUI 88 may include a representation that is a stylized version of the wind farm 200, or it may be a realistic representation of the farm 200. The wakes from each turbine 202 may be shown interacting to represent the physics of the wind dynamics across the farm as shown by resultant wake 80. The representation 80 may be a symbolic representation of the interaction to represent variables relevant to the efficiency or other properties of the farm, or may represent key properties of the physics of the interactions of the wind and wakes across the farm. Further, the shape and/or form of the wake 80 may change dependent upon the operating conditions of the turbines 202 and the environmental airflow caused by the turbines 202. Contextual conditions that impact the turbines 202 within the farm 200 may be overlaid on the graphical representation of the farm 200. A representation of the turbines 202 that in balance are optimized (based on existing analytics) may also be provided.

In example embodiments, the visualization of the interactions of wind and wakes across the farm 200 may be static or may be animated to correspond to the animations of the blades on the turbines 202. The turbines 202 may be shown in the context of a set of controls and visualizations of other farm properties. As controls for individual turbines 202 or sets of assets across the farm change, feedback visualizations may change. Visualizations and controls associated with a specific turbine 202 can be shown associated with the specific turbine. Contextual conditions (e.g., wind direction) may be shown integrated into the image of the farm (e.g., as indicated by the direction of the wakes). Thus, in an example embodiment, the GUI 88 leverages a digital twin representation of a wind turbine 202 (e.g., a plurality of digital counterparts of a plurality of turbines located in the wind farm 200) to enhance (ideally optimize) performance of the turbines in the wind farm 200. The digital equivalent of the farm 200 may correspond to a virtual control system including model-based representation of turbines as well as an overall wind farm. It will be appreciated that the example GUIs can be used in any systems where physical equipment has a digital counterpart.

When the turbines 202 or a set of turbines 202 are optimized as a system, a visual representation of the set of turbines 202 that are optimized can be overlaid across the relevant turbine images. The representation may change based on how close the set of turbines 202 are to being optimized as a system (e.g., by intensity of the color coding).

In an example embodiment, the model-based HMI does not execute controls directly on individual assets, but instead outcome-based goals may be specified and the virtual control system and analytics identify the optimal settings to achieve the user's goals and then executes them. The HMI 56 may represent a conceptual model, for example, of the most critical controls and interaction elements (as determined by a machine-learning algorithm applied to the digital model and the specific context of the farm). The user may then be able to interact with the controls and observe the feedback from the visualized interaction elements until feedback is provided about the areas within the farm that have been optimized at systems level. Specific interaction design patterns for wind farm virtual HMI management are provided in the example GUIs.

Referring now to FIG. 12, a flow diagram of a computer-implemented method 250 for generating a digital twin or equivalent of a wind farm 200 having a plurality of wind turbines 202 is illustrated. As shown at 252, the method 250 includes monitoring, via one or more sensors located on each of the plurality of wind turbines, one or more operating parameters of the wind turbine. As shown at 254, the method 250 receiving, via a farm-based first communication network, signals generated by the one or more sensors, the first communication network having one or more individual wind turbine control systems communicatively coupled to the one or more wind turbines and an overall wind farm control system. As shown at 256, the method 250 communicating, via the first communication network, the signals to a cloud-based second communication network via an industrial gateway, the second communication network having a digital infrastructure with a plurality of digital models of the one or more wind turbines. As shown at 258, the method 250 includes controlling, via the digital models of the second communication network, one or more operating parameters of the wind farm based on the signals.

In one embodiment, the method 250 may further include monitoring, via an industrial firewall (e.g. firewalls 35) configured between the first and second communication networks, incoming and outgoing network traffic based on predetermined security rules so as to protect the digital system.

In another embodiment, the method 250 may include communicating at least one of the one or more operating parameters or the digital models to a customer cloud-based infrastructure communicatively coupled to the second communication network. In further embodiments, the method 250 may include storing, via a time-series data store of the first communications network, the signals generated by the one or more sensors.

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A digital system for managing a wind farm having a plurality of wind turbines electrically coupled to a power grid, the system comprising:
   a farm-based first communication network comprising one or more individual wind turbine control systems communicatively coupled to the one or more wind turbines and an overall wind farm control system;
   a cloud-based second communication network communicatively coupled to the first communication network via an industrial gateway, the second communication network comprising a digital infrastructure comprising a plurality of digital models of the one or more wind turbines,
   wherein the plurality of digital models of the one or more wind turbines are continuously updated during operation of the wind farm via data supplied by the farm-based first communication network; and
   wherein the plurality of digital models includes physics-based models of the one or more wind turbines representing behavior thereof.

2. The system of claim 1, wherein each of the one or more individual wind turbine control systems comprises a real-time control system, and wherein the overall wind farm control system comprises a non-real-time control system.

3. The system of claim 2, wherein the overall wind farm control system comprises a Supervisory Control and Data Acquisition (SCADA) system of the wind farm.

4. The system of claim 3, wherein each of the one or more wind turbines comprise one or more sensors configured to collect at least one of operating data or wind data from respective wind turbines and send collected data to the SCADA system, wherein the SCADA system is further configured to communicate the collected data to the second communications network.

5. The system of claim 1, further comprising at least one industrial firewall configured between the first and second communication networks, the industrial firewall configured to monitor incoming and outgoing network traffic based on predetermined security rules so as to protect the digital system.

6. The system of claim 5, further comprising a customer cloud-based infrastructure communicatively coupled to the second communication network and an additional firewall configured between the second communication network and the customer cloud-based infrastructure.

7. The system of claim 1, wherein the first communications network further comprises a time-series data store communicatively coupled to the one or more wind turbines.

8. The system of claim 1, wherein the industrial gateway further comprises at least one of a data collector, an edge analytics module, and a watchdog module.

9. The system of claim 1, further comprising a user interface communicatively coupled to the first and second communication networks.

10. The system of claim 1, wherein the digital infrastructure comprises at least one of an asset performance management module, a demand forecast module, a wind forecast module, an operations optimization module, a market performance module, an anomaly detection module, a real-time analytics module, an analytics engine module, an analytics catalog module, a data store module, a meso scale data module, a historical operational date module, a data ingestion module, a data stitching module, or a data aggregation module.

11. The system of claim 10, further comprising a business driver-based modeling module configured to translate data from the demand forecast module and the wind forecast module into a business model configured to maximize energy production while maintaining optimal operating conditions.

12. A computer-implemented method for managing a wind farm having a plurality of wind turbines, the method comprising:
   monitoring, via one or more sensors located on each of the plurality of wind turbines, one or more operating parameters of the wind turbines;
   receiving, via a farm-based first communication network, signals generated by the one or more sensors, the first communication network having one or more individual wind turbine control systems communicatively coupled to the one or more wind turbines and an overall wind farm control system;
   communicating, via the first communication network, the signals to a cloud-based second communication network via an industrial gateway, the second communication network having a digital infrastructure with a plurality of digital models of the one or more wind turbines; and
   controlling, via the digital models of the second communication network, one or more operating parameters of the wind farm based on the signals;
   wherein the plurality of digital models include physics-based models of the one or more wind turbines representing behavior thereof.

13. The method of claim 12, further comprising:
   continuously transferring data between the first communication network and the second communication network,
   analyzing the data via an analytics module, and
   continuously updating the digital models of the second communication network during operation of the wind farm via based on the analytics module.

14. The method of claim 12, further comprising monitoring, via an industrial firewall configured between the first and second communication networks, incoming and outgoing network traffic based on predetermined security rules so as to protect the digital system.

15. The method of claim 12, further comprising communicating at least one of the one or more operating parameters or the digital models to a customer cloud-based infrastructure communicatively coupled to the second communication network.

16. The method of claim 12, further comprising storing, via a time-series data store of the first communications network, the signals generated by the one or more sensors.

17. The method of claim 12, wherein the industrial gateway further comprises at least one of a data collector, an edge analytics module, and a watchdog module.

18. The method of claim 12, further comprising a user interface communicatively coupled to the first and second communication networks.

19. The method of claim 12, wherein the digital infrastructure comprises at least one of an asset performance management module, a demand forecast module, a wind forecast module, an operations optimization module, a market performance module, an anomaly detection module, a real-time analytics module, an analytics engine module, an analytics catalog module, a data store module, a meso scale data module, a historical operational date module, a data ingestion module, a data stitching module, or a data aggregation module.

20. The method of claim 19, further comprising a business driver-based modeling module configured to translate data from the demand forecast module and the wind forecast module into a business model configured to maximize energy production while maintaining optimal operating conditions.

* * * * *